United States Patent
Bharath et al.

(10) Patent No.: US 9,959,557 B2
(45) Date of Patent: May 1, 2018

(54) DYNAMICALLY GENERATED AUDIO IN ADVERTISEMENTS

(71) Applicant: Pandora Media, Inc., Oakland, CA (US)

(72) Inventors: Shriram Bharath, Oakland, CA (US); Jacek Adam Krawczyk, San Francisco, CA (US); Christopher Irwin, Los Altos, CA (US)

(73) Assignee: Pandora Media, Inc., Oakland, CA (US)

( * ) Notice: Subject to any disclaimer, the term of this patent is extended or adjusted under 35 U.S.C. 154(b) by 715 days.

(21) Appl. No.: 14/500,763

(22) Filed: Sep. 29, 2014

(65) Prior Publication Data

US 2016/0092932 A1    Mar. 31, 2016

(51) Int. Cl.
*G06Q 30/02*   (2012.01)
*G10L 13/00*   (2006.01)

(52) U.S. Cl.
CPC ..... *G06Q 30/0271* (2013.01); *G06Q 30/0276* (2013.01); *G10L 13/00* (2013.01)

(58) Field of Classification Search
CPC .......... G06Q 30/0251; G06Q 30/0255; G06Q 30/0269; G06Q 30/0271
See application file for complete search history.

(56) References Cited

U.S. PATENT DOCUMENTS

| | | | |
|---|---|---|---|
| 7,075,000 B2 | 7/2006 | Gang et al. | |
| 7,102,067 B2 | 9/2006 | Gang et al. | |
| 2007/0078709 A1* | 4/2007 | Rajaram | G06Q 30/02 705/14.71 |
| 2009/0204402 A1* | 8/2009 | Marwaha | G06Q 10/10 704/260 |
| 2010/0036731 A1* | 2/2010 | Vieri | G06Q 30/02 705/14.53 |
| 2011/0231261 A1 | 9/2011 | Sattaru et al. | |

FOREIGN PATENT DOCUMENTS

WO   WO 2014/107807 A1   7/2014
WO   WO 2014107807 A1 *  7/2014  ......... G06Q 30/0251

OTHER PUBLICATIONS

PCT International Search Report and Written Opinion for PCT/US2015/047975, dated Dec. 15, 2015, 9 Pages.

\* cited by examiner

*Primary Examiner* — David J Stoltenberg
*Assistant Examiner* — Robert C Johnson
(74) *Attorney, Agent, or Firm* — Fenwick & West LLP

(57) ABSTRACT

A content server provides a client device with audio content including an audio advertisement, which is provided in response to receiving a request for digital audio content from a client device associated with a user. The content server obtains user information about the user and retrieves advertisement text received from an advertiser, which are used to generate a personalized text advertisement. The personalized text advertisement is generated according to an advertisement template specifying an ordered combination of text components. The personalized text advertisement includes the received advertisement text, user information text selected from the obtained user information, and template text. The client device is provided with an advertisement based on the personalized text advertisement and is configured to play an audio version of the personalized text advertisement. The audio advertisement is generated using a text-to-speech algorithm at the client device or at the content server.

20 Claims, 9 Drawing Sheets ary embodiments of the structures and methods illustrated herein may be employed without departing from the principles of the invention described herein.

DYNAMICALLY GENERATED AUDIO IN ADVERTISEMENTS

BACKGROUND

1. Field of Art

The present invention generally relates to creation and delivery of audio advertisements, and more specifically, to dynamically generating vocal content in audio advertisements.

2. Background of the Invention

Providers of digital content may generate revenue by inserting advertisements into the digital content and receiving payment from advertisers according to a cost-per-impression (CPI) model or a pay-per-click (PPC) model. For example, the providers may insert audio advertisements between songs in an audio content stream provided to client devices. The CPI or PPC that advertisers are willing to pay for an advertisement depends on the advertisement's effectiveness. To improve advertisement effectiveness, digital content promoters deliver targeted advertisements that are more likely than a generic advertisement to engage users.

Traditional audio advertisements include spoken content delivered by a professional voice actor. Because voice actors are expensive, creators of audio advertisements produce a limited number of advertisements with variations to suit a limited number of target audiences. As personalized media delivered over the Internet has replaced broadcast media, target audiences of advertisements have splintered into numerous sub-audiences. Accordingly, traditionally produced audio advertisements do not effectively engage varied audiences having divergent tastes for content. Additionally, small businesses cannot readily afford voice actors to create audio advertisements, much less to produce multiple versions of an audio advertisement to specifically engage the varied interests of the businesses' customers. Accordingly, traditional approaches to creating and delivering audio advertisements do not effectively engage listeners.

SUMMARY

In one embodiment, a computer-implemented method for generating an audio advertisement using a personalized text ad comprises the following steps. A request for audio content is received from a client device associated with a user. Advertisement text received from an advertiser is retrieved. User information about the user of the client device is obtained. A personalized text ad is generated according to an advertisement template specifying an ordered combination of text components. The personalized text ad comprises the received advertisement text, user information text selected from the obtained user information, and template text. An audio advertisement based on an audio version of the personalized text ad is caused to play on the client device. The audio version is generated by a text-to-speech algorithm. The audio advertisement is played in a stream of audio content provided to the client device responsive to the request for audio content.

In one embodiment, a system comprises a processor and a computer-readable storage medium comprising instructions executable by the processor. The instructions comprise instructions to perform the following steps. A request for audio content is received from a client device associated with a user. Advertisement text received from an advertiser is retrieved. User information about the user of the client device is obtained. A personalized text ad is generated according to an advertisement template specifying an ordered combination of text components. The personalized text ad comprises the received advertisement text, user information text selected from the obtained user information, and template text. An audio advertisement based on an audio version of the personalized text ad is caused to play on the client device. The audio version is generated by a text-to-speech algorithm. The audio advertisement is played in a stream of audio content provided to the client device responsive to the request for audio content.

In one embodiment, a computer-readable storage medium comprises computer program instructions executable by a processor. The instructions comprise instructions for performing the following steps. A request for audio content is received from a client device associated with a user. Advertisement text received from an advertiser is retrieved. User information about the user of the client device is obtained. A personalized text ad is generated according to an advertisement template specifying an ordered combination of text components. The personalized text ad comprises the received advertisement text, user information text selected from the obtained user information, and template text. An audio advertisement based on an audio version of the personalized text ad is caused to play on the client device. The audio version is generated by a text-to-speech algorithm. The audio advertisement is played in a stream of audio content provided to the client device responsive to the request for audio content.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
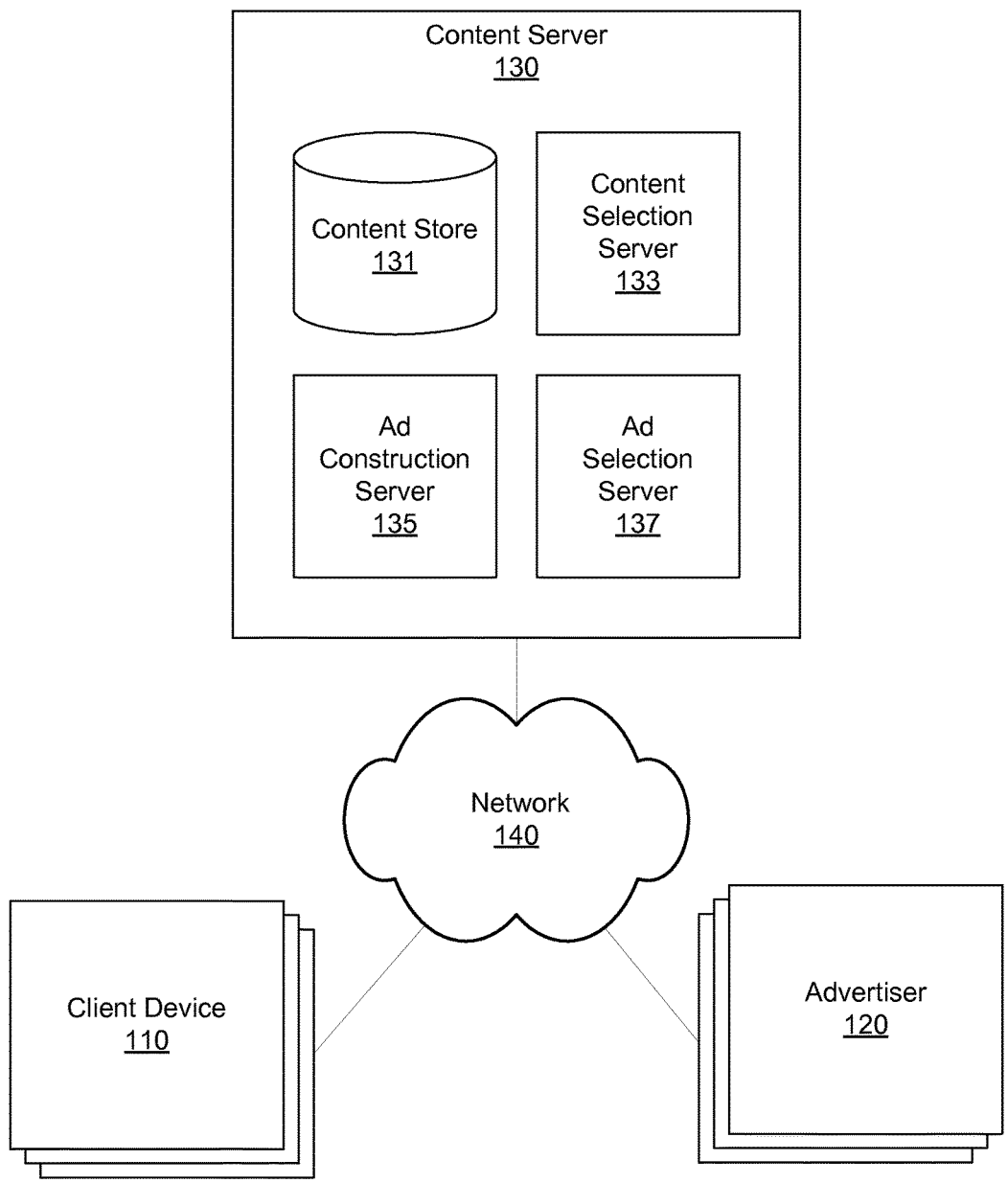
FIG. 1 illustrates a computing environment for generating personalized audio advertisements, according to an embodiment.

FIG. 1 illustrates a computing environment for generating personalized audio advertisements, according to an embodiment. The environment includes entities such as client devices 110, advertisers 120, and a content server 130.

The client devices 110 are computing devices such as smartphones with an operating system such as ANDROID or APPLE IOS, tablet computers, laptop computers, desktop computers, electronic stereos in automobiles or other vehicles, or any other type of network-enabled device that plays digital content. Typical client devices 110 include the hardware and software needed to input and output sound (e.g., speakers and microphone), connect to the network 140 (e.g., via Wi-Fi and/or 4G or other wireless telecommunication standards), or determine the client devices' current geographic location (e.g., using a Global Positioning System (GPS) unit).

The client devices 110 may have an application that allows interaction with the content server 130. For example, the application could be a browser that allows a user of the client device 110 to obtain content by browsing a web site of the content server 130. As another example, the application could be an application specifically designed (e.g., by the entity controlling the content server 130) to enable interactions with the content server 130 and its content. In addition to allowing a user to obtain content from the content server 130, the application may also provide the content server 130 with data about the status and use of the client device 110, such as its network identifier and geographic location. In some embodiments, the user of the application may elect to disable this feature.

The application on a particular client device 110 may be associated with a user of the client device 110 (e.g., via a one-time registration, or a username and password pair or other credentials). When the application is associated with a user, the application can store or otherwise gain access to user information such as user profile data (e.g., interests, demographics, content preferences, location). User information may be expressly provided through the application to configure a user profile on the content server 130.

Advertisers 120 are entities that provide advertisement text, targeting criteria, and other advertisement preferences (e.g., budget, bid price) to the content server 130. Advertisers 120 refers both to people or organizations that create advertisements and to the systems used to communicate with the content system 130 (e.g., computers). Targeting criteria indicate characteristics of users to receive an advertisement. The content server 130 generates personalized text advertisements (also referred to as personalized text ads) that include advertisement text received from an advertiser 120. The content server 130 also selects particular personalized text ads to provide to a client device 110 according to the received targeting characteristics. A personalized text ad provided to a client device 110 is converted into an audio advertisement using a text-to-speech algorithm.

The content server 130 provides audio content, such as songs, pieces of music, or audio recordings. In one embodiment, the content server 130 provides streamed audio content, but the content server 130 may alternatively or additionally provide other forms of media, such as videos, animations, movies, slideshows, images, or video games. Audio content refers to media having an audio component.

In one particular embodiment referred to throughout the specification, the content server 130 provides streamed audio. Subsequent references to "playing" or other audio-related terminology could equally apply to (for example) presenting videos or otherwise providing media from the content server 130 to a user.

The content server 130 provides audio advertisements (also referred to as "audio ads"), which may be interspersed with, or incorporated into, non-advertisement audio content. An audio advertisement refers to audio content containing a marketing communication, which is typically delivered in exchange for a consideration (e.g., monetary compensation) from a third-party. For example, the content server 130 provides a stream of audio content including audio advertisements interspersed between songs. Alternatively or additionally, the content server 130 incorporates audio advertisements into animation, video, or game content.

The client devices 110, the advertisers 120, and the content server 130 are connected via a network 140. The network 140 may be any suitable communications network for data transmission. The network 140 uses standard communications technologies and/or protocols and can include the Internet. In another embodiment, the network 140 includes custom and/or dedicated data communications technologies.

Content Server

The components of the content server 130 include a content store 131, a content selection server 133, an ad construction server 135, and an ad selection server 137. The components of the content server 130 are not necessarily implemented on any one device or group of co-located devices. For example, the content server 130 may include a content distribution network that supplies music from geographically dispersed content stores 131. Some components of the content server 130 may be controlled by a third-party entity; for example, the function of the ad selection server 137 is provided in whole or in part by an advertisement exchange.

The content store 131 stores audio content and associated metadata. Metadata about audio content includes bibliographic information (e.g., artist, composer, album title, track name, track number, release date, record label, genre) and associated audio features that characterize the associated audio content. An audio feature describes musicological characteristics of media items. For example, if the audio content is a song, the audio features of the song may indicate the underlying characteristics of the song such as the gender of the singer, the type of background vocals, the tempo, the quality of the tones (e.g., pure or distorted), whether the melody dominates the composition, and an amount of gospel influence. A given unit of audio content may have many audio features, such as 100-500 audio features. In one embodiment, the mapping of audio content to audio features is established using the MUSIC GENOME PROJECT database created by PANDORA MEDIA, INC. of Oakland, Calif.

The content selection server 133 provides requested content to the requesting client device 110. If the content server 130 provides streaming audio, for example, then the content selection server 133 selects audio content and streams the selected audio to the client device 110 over time. The content selection server 133 may select content for a user based at least in part on user information (e.g., musical preferences), user requests, and a combination thereof.

In one embodiment, the content selection server 133 generates content playlists and selects audio content from the content playlists based on a seed value received from a user. A seed value describes one or more aspects of the content playlist that the user would like formed. Seed values may specify bibliographic information about audio content (e.g., track title, band name, album title) or any term to describe music (e.g., musical genre, historical era, an audio feature). The content selection server 133 extracts audio features from the seed value using a mapping between audio content associated with the seed value and corresponding media features in the content store 131. If the seed value does not describe a single item of audio content, the content selection server 133 retrieves one or more items audio content associated with the seed value. For example, the content selection server 133 retrieves one or more representative songs (e.g., of a genre, of a band). The content selection server 133 uses the extracted audio features to dynamically generate a content playlist of audio content having audio features similar to the extracted audio features. For example, given a seed value of a band X, the content selection server 133 locates a song Y by band X and identifies audio features that characterize the song Y.

The ad construction server 135 generates personalized text ads including advertisement text from an advertiser 120 and user information applicable to users of one or more client devices 110. User information includes user profile data provided to the content server 130 (e.g., name, residence, age, preferred language), content data determined from a user's activities on the content server 130 (e.g., content history, content preferences), location data obtained from the client device 110, or preference data obtained by the content server 130. User profile data indicates enduring personal characteristics, whether explicitly obtained through the user interface 320 or obtained otherwise (e.g., from a social networking service the user has authorized the content server 130 to access). The personalized text ad may also include news text relevant to a user. The ad construction server 135 is described in further detail with respect to FIG. 4.

The ad selection server 137 provides advertisements to a client device 110 receiving audio content. In one embodiment, the application on the client device 110 is configured to request advertisements between items of audio content. The application queries the ad selection server 137, which selects an advertisement. The selected advertisement may be an advertisement with pre-recorded audio received from an advertiser 120, or an advertisement based on a personalized text ad from the ad construction server 135. The ad selection server 137 may also select non-audio advertisements to deliver to the client device 110 (e.g., interactive visual content, animations, images). In one embodiment, the ad selection server 137 selects advertisements whose targeting criteria (as stipulated by the advertiser 120) match one or more pieces of user information associated with the client device 110. The ad selection server 137 is described in further detail with respect to FIG. 5.

Advertisement Templates

Figure 2:
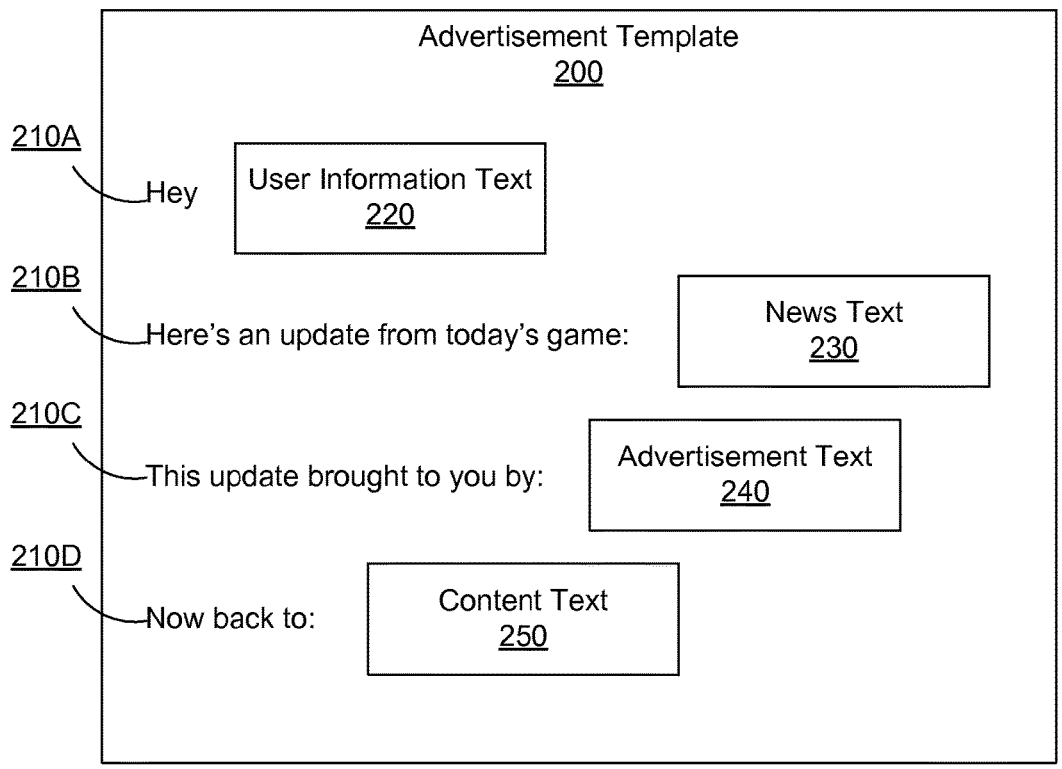
FIG. 2 illustrates an advertisement template used to generated personalized text advertisements, according to an embodiment.

FIG. 2 illustrates an example advertisement template 200 used to generated personalized text ads, according to an embodiment. In one embodiment, the advertisement template 200 specifies a sequence of text components. Example text components include template text 210A-210D, user information text 220, news text 230, advertisement text 240, and content text 250. The ad construction server 135 receives different text strings to fill each component of the advertisement template 200 and selects different combinations of text to populate the components of the advertisement template 200.

Template text 210 provides connective language between other components of an advertisement template 200. In the illustrated embodiment, the template text 210 is specific to the advertisement template 200, but the advertisement template 200 may include multiple options for each component having template text 210. For example, the advertisement template 200 specifies that the template text 210A "Hey" could also be filled by alternative template text 210 "Howdy" or "What's up."

The components 220-250 may typically be filled by information collected by the ad construction server 135. User information text 220 is text derived from user information such as user profile data (e.g., a name, a city of residence). The news text 230 is text derived from an informational notice (e.g., a news report, scores from a sports game). Advertisement text 240 is received from an advertiser 120 (e.g., "buy our sandals!"). Content text 250 is text relevant to content a user is playing, and may be derived from content data describing a user's past and present activity on the content server 130. For example, the content text 250 is a band name or a genre describing a playlist streamed through the client 110.

One example personalized text ad generated from the advertisement template 200 is: "Hey (210A) Jimmy (220). Here's an update from today's game (210B): The Giants are beating the Dodgers 5 to 3 (230). This update is brought to you by: (210C) Citizens for Underwood: Keeping Congress Honorable (240). Now back to: (210D) 90s rock (250)." Assuming there are w possible choices for user information text 220, x possible choices for news text 230, y possible choices of advertisement text 240, and z possible choices of content text 250, the ad construction server 135 may generate up to w×x×y×z distinct personalized text advertisements using the advertisement template 200.

In one embodiment, the advertisement template 200 includes slots for multiple interchangeable sections. Each section is itself an advertisement template 200 with one or more components that may be interchangeably filled with a particular type of text. For example, an advertisement template 200 includes beginning, middle and end sections. Accordingly, an advertisement template 200 composed of sections provides more variety in personalized text ads without an exhaustive set of templates providing various orders and combinations of different text components.

Client Device

Figure 3:
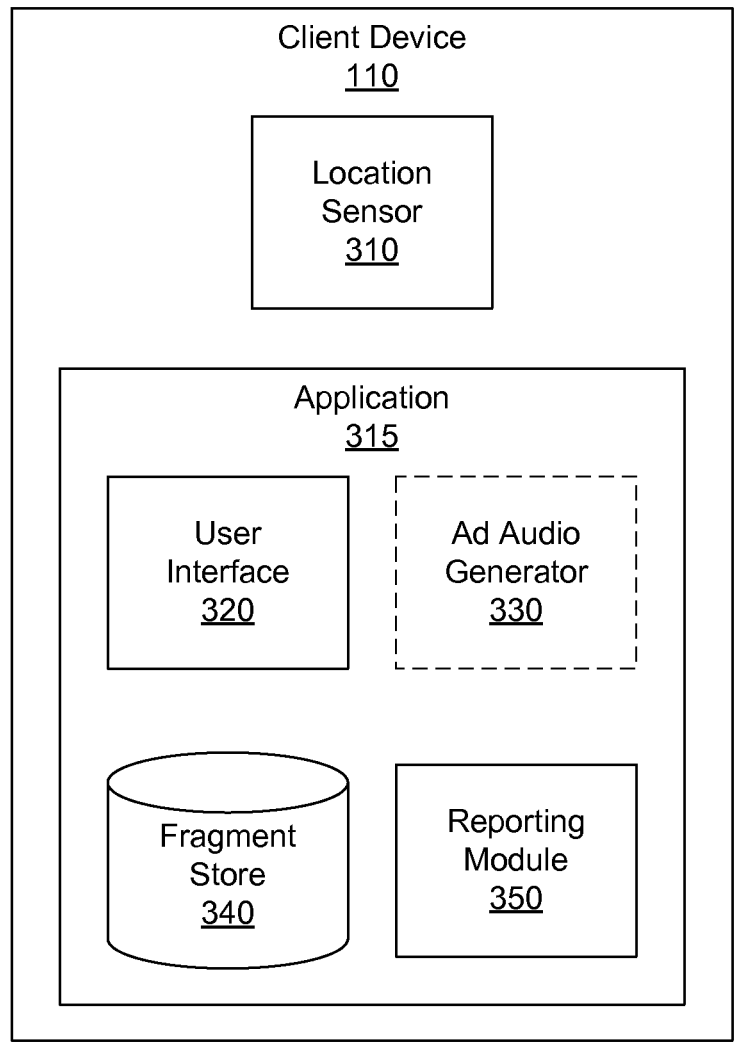
FIG. 3 is a high-level block diagram illustrating a detailed view of a client device, according to an embodiment.

FIG. 3 is a high-level block diagram illustrating a detailed view of a client device 110, according to an embodiment. The client 110 includes a location sensor 310 and an application 315. The application 315 includes a user interface 320, an optional ad audio generator 330, a fragment store 340, and a reporting module 350.

The location sensor 310 determines a particular geographic location of the client device 110, such as coordinates provided by a Global Positioning System (GPS) sensor. The location sensor 310 may infer location from data collected from network infrastructure. For example, location is determined from cell tower triangulation or a geographical location associated with a nearby device's media access control (MAC) address (e.g., a Wi-Fi router's MAC address). In one embodiment, the application 315 periodically accesses the location sensor 310 (or a recently cached location reading) and transmits the location to the content server 130. Alternatively or additionally, the content server 130 infers the client device's location from network routing information (e.g., from an Internet Protocol address associated with the client device 110). The user may disable location readings using one or more settings on the application 315 or an operating system of the client 110.

The user interface 320 facilitates interaction between the user and the content server 130. For example, the application 315 provides a graphical user interface for interacting with an audio stream. An example user interface 320 displays bibliographic information about a currently playing or previously played song and may also include an image advertisement selected by the ad selection server 137. The user interface 320 may also provide playback controls (e.g., pause, skip, play) and feedback controls (e.g., like, dislike, favorite, rate, share, bookmark) to indicate the user's positive, negative, or indifferent reaction to a song. In one embodiment, a user may request a playlist through the user interface 320 by providing a seed value used by the content selection server 133 to generate a content playlist.

The ad audio generator 330 converts a personalized text ad to an audio advertisement using a text-to-speech (TTS) algorithm. The ad audio generator 330 may use various TTS algorithms, including a TTS algorithm available through an operating system of the client 110, through the application 315, or through an external server. The TTS algorithm may be dictionary based or phonetic based. The TTS algorithm may include linguistic analysis to determine pronunciation (e.g., of homonyms) and prosody of phrases, words, syllables, or phonemes. In one embodiment, the ad audio generator 330 generates the audio advertisement based on vocal parameters received from the ad selection server 137. Vocal parameters affect the audio output synthesized by the TTS algorithm. Vocal parameters may specify a prepackaged voice (e.g., male or female, a silky voice, a gravelly voice) or may indicate more nuanced variables that control how the TTS algorithm synthesizes audio. Example vocal parameters include register, tone, or emotion of the spoken audio produced by the ad audio generator 330.

In addition to generating an audio version of a personalized text ad, the ad audio generator 330 may modify the audio version to produce a finished audio ad. The ad audio generator 330 may combine the audio version of the personalized text ad with background music or sound effects. For example, if the personalized text ad includes a traffic report, the ad audio generator 330 overlays helicopter noises over the portion of the personalized text ad containing the traffic report. The ad audio generator 330 may modify the audio version of the personalized text ad. For example, the ad audio generator 330 provides fade-in or fade-out effects.

The fragment store 340 stores audio content received from the audio server 130 to be played by the content device 110. In one embodiment, the content server 130 provides content fragments comprising a number of audio content items (e.g., four songs). The content selection server 133 may select related audio content for use in a single content fragment. For example, a content fragment contains songs having similar audio features, so the user experiences smoother transitions between songs. Additionally, a content fragment beneficially prevents interruption of playback due to momentary lapses of connectivity. Content fragments may include slots for advertisements (e.g., zero to two advertisements). A slot for an advertisement provides instructions for retrieving an advertisement from the content server 130 and playing an audio version of the advertisement through the client device 110. Alternatively or additionally, the stored content fragment includes the content of the audio advertisement.

The reporting module 350 transmits usage data to the content server 130. Usage data includes feedback received through the user interface 320. Feedback include explicit feedback (from a dedicated feedback in the user interface 320) or implicit (e.g., skipping a song, sharing a song). Usage data also includes a geographic location from the location sensor 310. The content server 130 generates and selects advertisements based at least in part on the transmitted usage data.

Ad Construction Server

Figure 4:
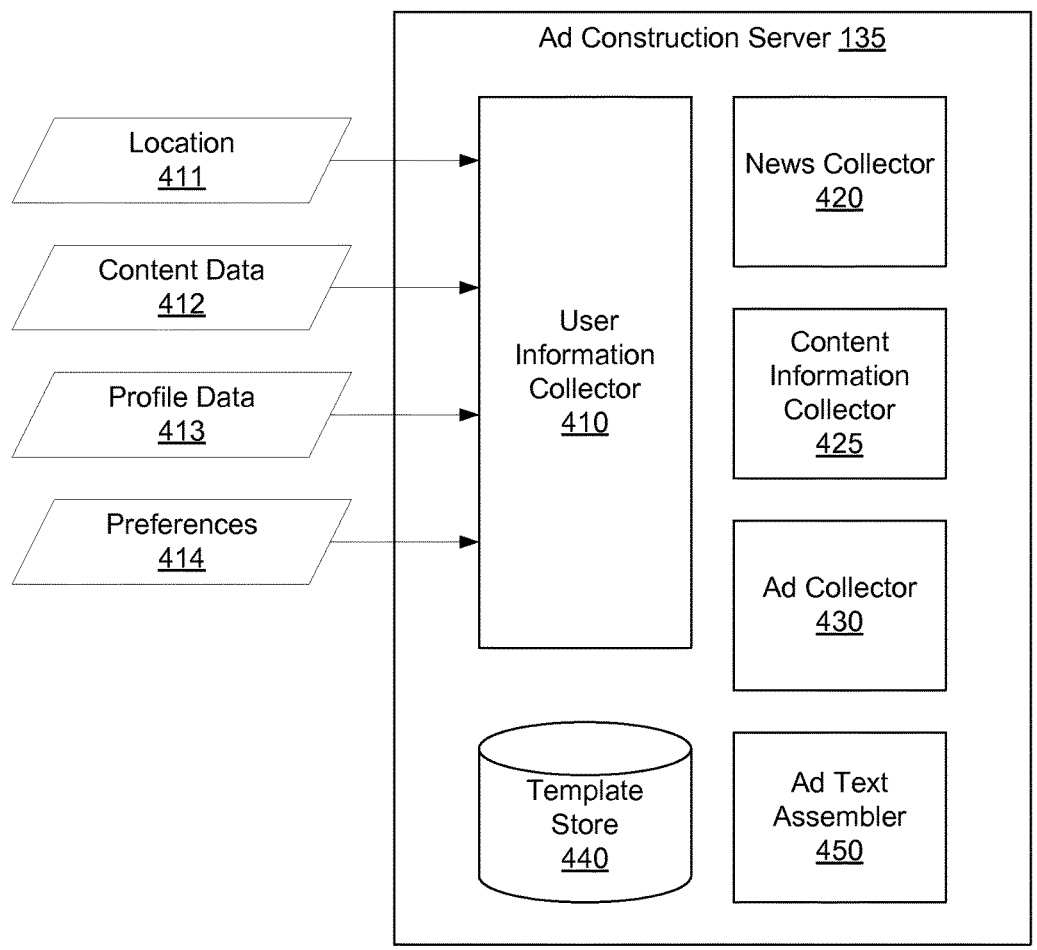
FIG. 4 is a high-level block diagram illustrating a detailed view of an ad construction server, according to an embodiment.

FIG. 4 is a high-level block diagram illustrating a detailed view of the ad construction server 135, according to an embodiment. The ad construction server 135 includes a user information collector 410, a news collector 420, a content information collector 425, an ad collector 430, a template store 440, and an ad text assembler 450. Some embodiments of the ad construction server 135 have different modules than those described here or may distribute functions in a different manner than that described here. In one embodiment, the ad construction server 135 constructs personalized text ads for a particular user. Alternatively or additionally, the ad construction server 135 constructs personalized text ads for a given target audience (e.g., individuals having a certain age range, location, and preferred language).

The user information collector 410 retrieves user data received or otherwise obtained by the content server 130. From the user data, the user information collector 410 outputs user information text and content text for use by the ad text assembler 450. In one embodiment, the user information collector 410 retrieves user information such as location data 411, content data 412, profile data 413, and preference data 414.

Location data 411 describes a location associated with the user or with the client device 110. Location data 411 includes relatively precise data such as geographic coordinates (e.g., from the reporting module 350) or an address (e.g., a past or present residential address or billing address from the user's user profile). Location data 411 also includes less precise data indicating a general geographic region (e.g., postal code, municipal area, city, town, neighborhood, country, state, county). The user information collector 410 outputs user information text indicating a user's location for use in a personalized text ad. Such user information text typically indicates the user's general geographic location. The news collector 420 and ad collector 430 use a received location 411 to retrieve more relevant informational notices and advertisements, respectively.

Content data 412 describes content provided to a client device 110 associated with a user. Content data 412 include historical content as well as content currently playing on the client device 110 (e.g., obtained from the reporting module 350, inferred based on the content fragment transmitted to the client device 110). Using content data 412, the user information collector 410 determines the audio content that a user is currently listening to (or going to be listening to after an advertisement) and outputs content text (e.g., a band name, an audio playlist descriptor, a title) describing the audio content.

Profile data 413 includes data explicitly provided by a user and otherwise obtained about the user. The user information collector 410 retrieves profile data 413 used to derive user information text. For example, the user information text is the user's name or inferred social role (e.g., father, grandmother, student, worker, tycoon). The user information collector 410 also retrieves profile data 413 to more efficiently generate personalized text based advertisements. Such profile data 413 includes a user's preferred language, which the news collector 420 and ad collector 430 use to gather news text and advertisement text in a language intelligible to the user. Similarly, the ad text assembler 450 uses the preferred language to select an appropriate advertisement template in the user's language. In addition, the profile data 413 may include demographics (e.g., age, gender, socioeconomic status, education) and interests (e.g., politics, leisure activities, hobbies), or other user information included in advertiser targeting criteria. The user information collector 410 outputs user information text derived from profile data 413.

The preference data 414 includes content preferences as well as advertisement preferences. Content preferences refer to user inclinations towards audio content and may be quantified with respect to a particular item of bibliographic information about audio content (e.g., track title, artist, album, genre) or audio features (e.g., from the MUSIC GENOME PROJECT database). Advertisements preferences may be quantified with respect to a particular product, a particular brand, a particular advertisement, or a particular component of an advertisement (e.g., the voice, the background music). Content preferences may be received from the user (e.g., as part of a user profile) or inferred from user activity including explicit feedback (from feedback buttons on the user interface 320), implicit feedback (e.g., shares, skips), and logged user activity (e.g., songs provided through the content server 130). For example, if a user provides positive feedback toward audio content (e.g., listening to the entirety of a song), then the user's preference data 414 is modified to indicate a greater inclination to the audio content's audio features and bibliographic information. Content preferences may also include preferences for informational notices, such as favorite financial instruments (e.g., stocks), favorite sports teams, and favorite news categories.

The news collector 420 obtains informational notices in the user's preferred language based on the user's location data 411 and outputs news text derived from the obtained informational notice. Informational notices are content providing interesting or useful information to the user. Informational notices include updates that have temporal relevance and include news, sports, stocks, weather, and traffic. To ensure that informational notices are relevant to the user, the news collector 420 retrieves informational notices that are associated with a geographic area comprising the user's location data 411. For example, the news collector 420 obtains informational notices with a global, national, and local target audience subject to the user's location data 411.

The news collector 420 may identify updates based at least in part on determining that a significant event has occurred. The news collector 420 may identify "significant effects" from a user's perspective based on the user's location data 411, content data 412, or preference data 414. For example, the news collector 420 identifies an update in response to identifying a news story about a musician that the user is currently listening to. As another example, the news collector 420 identifies an update about a sports game in response to determining that the user's favorite team has scored. As a third example, the news collector 420 generates informational notices about financial markets market in response to detecting a change in a financial signal (e.g., a stock price, a stock index value, a currency value, a bond price, an implied interest rate) that deviates from historically expected behavior and that the user follows. As a fourth example, the news collector 420 generates an update about the user's local weather in response to receiving a weather alert from a governmental agency. As a final example, the news collector 420 generates an update about traffic nearby the user in response to determining that speeds on a road differ from the speed limit or from the expected speed given the day of the week and time.

The content information collector 425 obtains supplemental content information based on the content data 412 and outputs content text. Supplemental content information is media (e.g., interviews, articles, documentaries, radio programs) about audio content. Example supplemental content information includes interesting facts, explanations, or commentary regarding audio content that the user has listened to, is listening to, or will listen to. For example, the supplemental content information describes the artist who wrote a song or a producer who worked on an album. As another example, the supplemental content information explains interaction between a song's melody and harmony. The content information collector 425 identifies supplemental content information containing mentions of bibliographic information about audio content included in the content data 412. The content information collector 425 outputs content text derived from the supplemental content information. For example, the content text is an excerpt or a summary of the supplemental content information.

Supplemental content information may be obtained from informational notices that are relevant to both the user's location data 411 and content data 412. For example, the content information collector 425 identifies an informational notice about an artist the user is listening to in response to determining that the user is in a location where the artist has been recently spotted or where the artist is going to have a concert.

The ad collector 430 takes as input a user's location data 411, content data 412, and profile data 413, filters advertisement text based on targeting criteria, and outputs eligible advertisement text for use by the ad text assembler 450. Some advertisement text is paired with targeting criteria specifying user characteristics of the target audience. If the targeting criteria disqualify users who do not meet the targeting criteria from receiving the advertisement text to, then the ad collector 430 performs a filtering step based on the targeting criteria to disqualify the users. The targeting criteria may apply based on location data 411, content data 412, or user profile data 413. For example, an advertisement's targeting criteria specify that an audio version of the advertisement text should be played only for middle-aged residents of Missouri who speak English. The ad collector 430 advantageously reduces the number of personalized text ads generated by the ad construction server 135 by providing individualized filtering. In this embodiment, the ad collector 430 identifies only advertisement text that the user is eligible to receive. As a result, the ad text assembler 450 does not generate personalized text ads that the user is ineligible to receive (as specified by targeting criteria). Accordingly, filtering advertisement text at the ad collector 430 beneficially reduces processing and memory costs of the ad construction server 135.

Some text advertisements include special targeting criteria that pair the advertisement text with an informational notice. The ad collector 430 determines whether the news collector 420 has obtained an informational notice meeting the targeting criteria. In response to determining that there is a relevant informational notice, the ad collector 430 outputs the advertisement text for use by the ad text assembler 450. The ad collector 430 may compare the targeting criteria to the content of the informational notice or to the content of news text derived from the information notice. For example, an advertiser 120 of dairy products submits advertisement text about ice cream to the content server 130. In the example, the advertiser 120 specifies in targeting criteria that the advertisement text about ice cream should be paired with updates about hot weather; accordingly, the ad collector identifies the ice cream advertisement text in response to the news collector 420 identifying informational notices about hot weather near the user's location.

The template store 440 is a repository for a plurality of text templates such as that described with respect to FIG. 2. A text template specifies a sequence of text components, including static template text specific to a template and dynamically selected text derived from user information, advertisement text, and informational notices. The template store 440 may also include sections of advertisement templates, where sections specify a sequence of text components. When the template store 440 includes templates, then templates specify a sequence of text components, sections, or a combination thereof.

The ad text assembler 450 takes as input advertisement text from the ad collector 430 and optionally user information text, content text, or news text. The ad text assembler 450 combines the various received strings of text into personalized text ads using a template from the template store 440. An example personalized text ad is described with respect to FIG. 2. In one embodiment, the ad text assembler 450 generates personalized text ads from various permutations of text components inserted into an advertisement template. The ad text assembler 450 stores generated personalized text ads or provides them to the ad selection server 137.

The ad text assembler 450 may determine whether an advertisement text component has associated targeting criteria that affect pairing the advertisement text with other advertisement text. The targeting criteria may specify one or more required strings of text that the advertisement text must be paired with or one or more impermissible instances of text that the advertisement text may not be paired with. For example, if advertisement text about ice cream has targeting criteria indicating the text advertisement should run only with news text about hot weather, then the ad text assembler 450 generates personalized text ads that have the ice cream advertisement text paired with the hot weather news text. It should be noted that the targeting criteria of the example ice cream advertisement text do not prevent the ad text assembler 450 from generating other personalized text ads that include the hot weather news text with other advertisement text.

In the embodiments described above, the news collector 420, the content information collector 425, the ad collector 430 perform filtering functions to tailor available news text, content text, and advertisement text to a particular user. In turn, the ad text assembler 450 further filters combinations of text in the advertisement template to prevent generation of personalized text ads with incompatible text components (as defined by targeting criteria of the advertisement text). The above-described embodiments beneficially reduce processing by generating fewer personalized text ads, which may be stored using less memory. In other words, the ad construction server 135 refrains from generating personalized text ads that have no or negligible chances of being selected by the ad selection server 137. However, other embodiments may perform some or none of the filtering described in conjunction with the ad construction server 135. For example, the ad selection server 137 may perform some or all of the filtering described in conjunction with the ad construction server 135.

Furthermore, other embodiments may generate personalized text ads for groups of users rather than individual users. In these embodiments, the ad construction server 135 generates personalized text ads for users having one or more instances of user information in common. For example, the group of users has a common location. Accordingly, the user information collector 410 outputs user text derived from the common location (e.g., "Hey Denver!") instead of a user's name, and the content information collector 425 and the ad collector 430 respectively output news text and advertisement text that are relevant to the common location. Another example group of users are listeners of the same content playlist. For this group, The user information collector outputs generic user text describing the content playlist ("Hey metalheads!"), and the content information collector 425 outputs content text relevant to audio content in the content playlist.

The ad construction server 135 may generate partially personalized text ads tailored to groups of users. A partially personalized text ads has some text components filled (e.g., for use by a group) and other text components to be filled in later (e.g., with user text or content text of a particular user). For example, the ad construction server 135 outputs a partially personalized text ad that includes location-specific news text and advertisement text. The ad server 130 then completes the personalized text ad with user information before the advertisement is delivered to a particular user's client device 110.

Ad Selection Server

Figure 5:
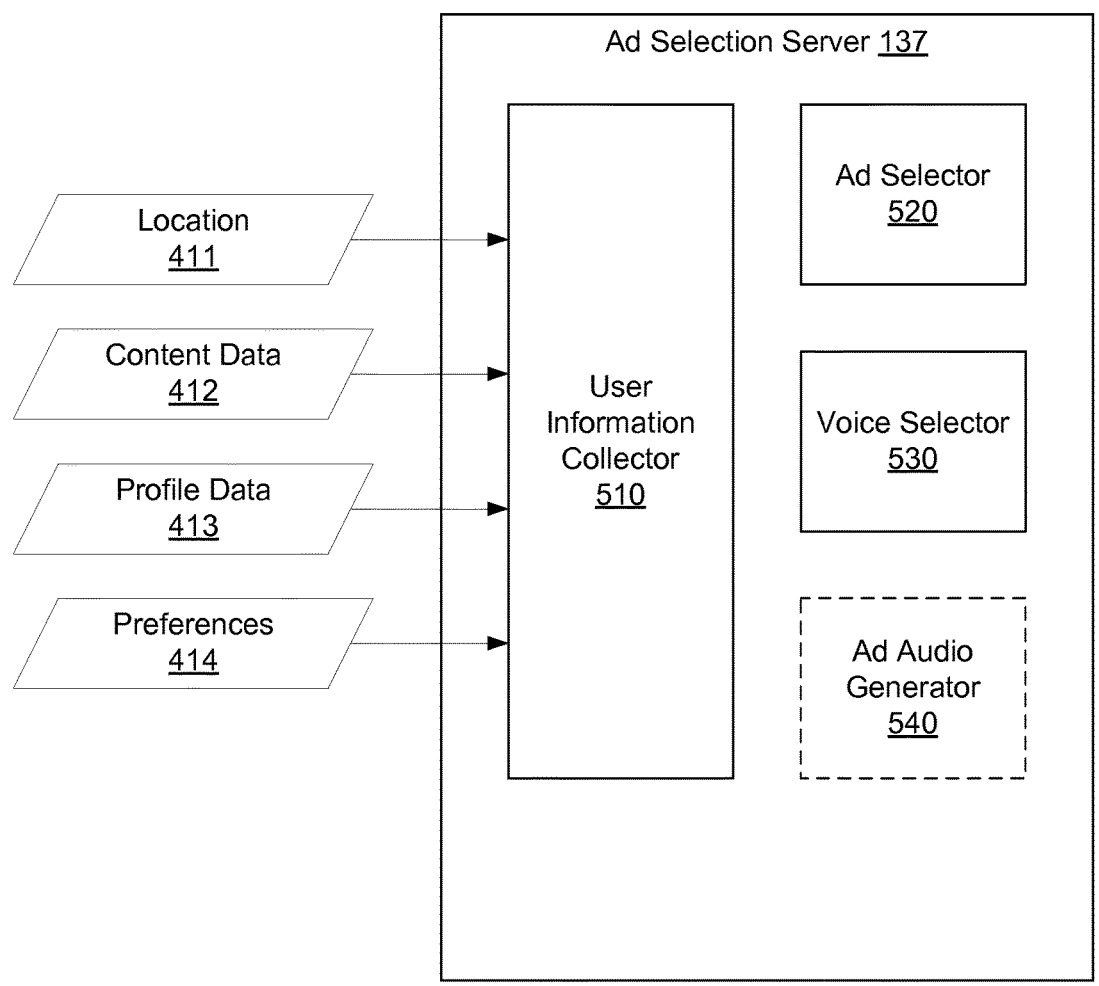
FIG. 5 is a high-level block diagram illustrating a detailed view of an ad selection server, according to an embodiment.

FIG. 5 is a high-level block diagram illustrating a detailed view of the ad selection server 137, according to an embodiment. The ad selection server 137 includes a user information collector 510, an ad selector 520, a voice selector 530, and optionally an ad audio generator 540. Some embodiments of the ad selection server 137 have different modules than those described here or may distribute functions in a different manner than that described here.

The user information collector 510 retrieves user data received or otherwise obtained by the content server 130. The user data is used to select personalized text ads and to select voices for the personalized text ads. In one embodiment, the user information collector 510 retrieves user information such as location data 411, content data 412, profile data 413, and preference data 414.

The ad selector 520 receives personalized text ads from the ad construction server 135 and selects one or more of the personalized text ads to provide to the client device 110. In one embodiment, the ad selector 520 determines scores between the user and the personalized text ads, ranks the personalized text ads by the scores, and selects a personalized text ad according to the ranking (e.g., the highest ranking). The ad selector 520 may determine the score from a weighted linear combination, for example, where each term depends on a match between a characteristic of the personalized text ad and user data indicating a positive or negative inclination toward the characteristic. The weighting of different terms depends on the advertisement characteristic's importance to the advertiser 120 or usefulness for predicting the advertisement's effectiveness.

Scoring an advertisement depends at least in part on a match between targeting criteria and the user's user information. For example, the ad selector 520 compares a user's location data 411, demographics (from the profile data 413), and interests (from the profile data 413) with corresponding user characteristics indicated by targeting criteria. The targeting criteria could be specific to the advertiser 120, specific to the advertisement text in a personalized text ad, or a combination thereof. The ad selector 520 may also determine the score based at least in part on the preference data 414, particularly advertisement preferences. The ad selector 520 modifies the score based on a user's like or dislike of advertisement characteristics present in the personalized text ad. For example, if a user has repeatedly given negative feedback about dog food advertisements, then the ad selector 520 decreases the score of a personalized text ad for dog food. The ad selector 520 may also modify a personalized text ad's score based on content data 412 (e.g., audio content played before or after the advertisement). In particular, if there is a match between content text in a personalized text ad (e.g., juicy tidbits about an artist's escapades) and bibliographic information about audio content adjoining the ad (e.g., the previous song is played by the artist), then the ad selector 520 increases the score. Accordingly, the ad selector 520 outputs one or more personalized text advertisements to be played on a user's client device 110.

The voice selector 530 receives a personalized text ad, determines vocal parameters for use in a TTS algorithm to create an audio version of the personalized text ad, and outputs the vocal parameters. In one embodiment, the voice selector 530 determines vocal parameters based on the personalized text ad and the user information gathered by the user information collector 510.

In one embodiment, the voice selector 530 determines vocal parameters based on a mapping between content and vocal parameters. The voice selector 530 identifies audio content associated with a personalized text ad (e.g., from content text in the personalized text ad, from content data 412 describing audio content played one to two songs before or after the audio advertisement). The voice selector 530 then obtains a correspondence between different vocal parameters and audio features of the identified audio content. For example, vocal parameters such as pitch, frequency content, emotion, and speed correspond to audio features such as register, timbre, emotional tone, and tempo. In particular, the voice selector 530 uses audio features describing vocalists in the identified audio content to determine vocal parameters. Using the correspondence, the voice selector 530 outputs the vocal parameters determined from the correspondence between the audio features and the vocal parameters.

In one embodiment, the voice selector 530 uses inferred user preferences 414 to determine vocal parameters. As users provide feedback on audio advertisements, the content server 130 adjusts user preferences about vocal parameters in the evaluated audio advertisements to reflect the feedback. Alternatively or additionally, user preferences about vocal parameters are inferred based on preferences for audio features. Using the correspondence between vocal parameters and audio features (especially those involving a vocalist), a user's preferences for audio features may be used to estimate preferences for vocal parameters.

In one embodiment, the voice selector 530 determines vocal parameters based on location data 411 and profile data 413. For example, a user's location 411 corresponds to a preferred vocal accent, and profile data 413 indicates a user's preferred language. Similarly, the voice selector 530 may determine average vocal preferences for different audience groups based on demographics and location. The average vocal preferences for similar users may be used to infer or suggest a user's vocal preferences. Similar users are users having one or more items of user information (e.g., location data 411, profile data 413) in common with a user.

To determine vocal parameters for a personalized text ad, the voice selector 530 combines inferred vocal parameter preferences. For numerical vocal parameters (e.g., speed, pitch, roughness), the voice selector 530 determines vocal parameters based on a weighted average of factors indicating a user's preferences for vocal parameters. For example, the weighting of terms corresponding to the advertisement text and the content data 412 is heavier than the weighting based on user location 411, profile data 413, and user preferences 414. For binary vocal parameters (e.g., gender) or vocal parameters selected among various alternatives (e.g., accent, overall voice, silkiness), the voice selector 530 scores the alternatives and selects the vocal parameter based on the score. The score reflects the user's predicted inclination toward the various vocal parameters. Different user data and advertiser preferences may receive varying weights used in a linear combination to determine the score. Alternatively or additionally, the voice selector 530 selects vocal parameters in accordance with preferences received from the advertiser 120 associated with the personalized text ad.

The ad audio generator 540 is similar to the ad audio generator 330 described in conjunction with FIG. 3. The ad audio generator 540 takes as input a personalized text ad and generates an audio version of the personalized text ad based on vocal parameters. Typically, the ad audio generator 540 is implemented on a server with greater computational resources than those available to the client device 110 implementing the ad audio generator 330. Consequently, the server-based ad audio generator 540 may use more computationally expensive TTS methods, which beneficially provide more natural spoken audio. On the other hand, a client-based ad audio generator 330 reduces network bandwidth usage because a text file of the personalized text ad is smaller than an audio file containing the audio version of the personalized text ad.

Providing a Personalized Audio Advertisement

Figure 6:
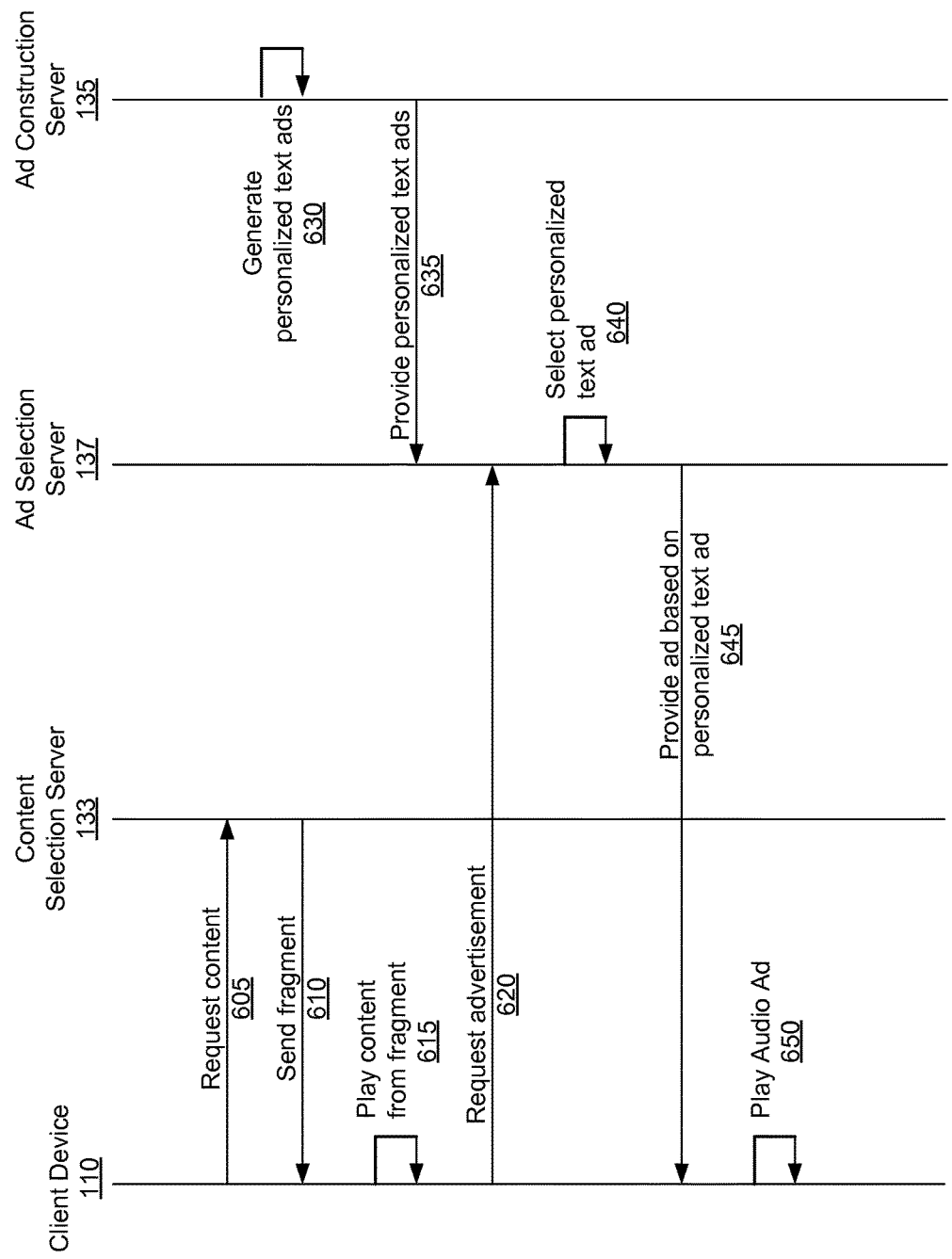
FIG. 6 is a sequence diagram illustrating interactions between the client device and the content server, according to an embodiment.

FIG. 6 is a sequence diagram illustrating interactions between the client device 110 and the content server 130, according to an embodiment. The client device 110 requests 605 content (e.g., to initiate a streaming session, in response to having less than a threshold amount of audio content stored in the fragment store 340). The content selection server 133 selects audio content and sends 610 a fragment comprising an ad creative placed between two items of selected audio content. An ad creative comprises executable instructions prompting the client device 110 to request 620 an advertisement.

After playing 615 an initial item of audio content, and prior to playing a next item of content, the client device 110 executes the ad creative. For example, the ad creative includes a pointer (e.g., a Uniform Resource Locator) to the ad selection server 137 and a JavaScript command instructing the client device 110 to request 620 an advertisement using the pointer to the ad selection server 137. By executing the ad creative, the client device 110 requests 620 an advertisement.

The ad construction server 135 generates 630 personalized text ads relevant to the user of the client device 110 and provides 635 the personalized text ads to the ad selection server 137. Alternatively or additionally, the ad construction server 135 generates 630 the personalized text ads for the client device 110 in response to a request from the ad selection server 137. In response to receiving 620 the request for the advertisement, the ad selection server 137 selects 640 advertisement text from those provided by the ad construction server 135.

The ad selection sever 137 provides 645 an advertisement based on the personalized text ad. The advertisement may be an audio version of the personalized text ad generated by the ad selection server 137 or may be a text advertisement and vocal parameters to configure a TTS algorithm on the client device 110 to generate an audio version of the personalized text ad. The client device 110 plays 650 the audio version of the personalized text ad.

Advertisement Generation

Figure 7:
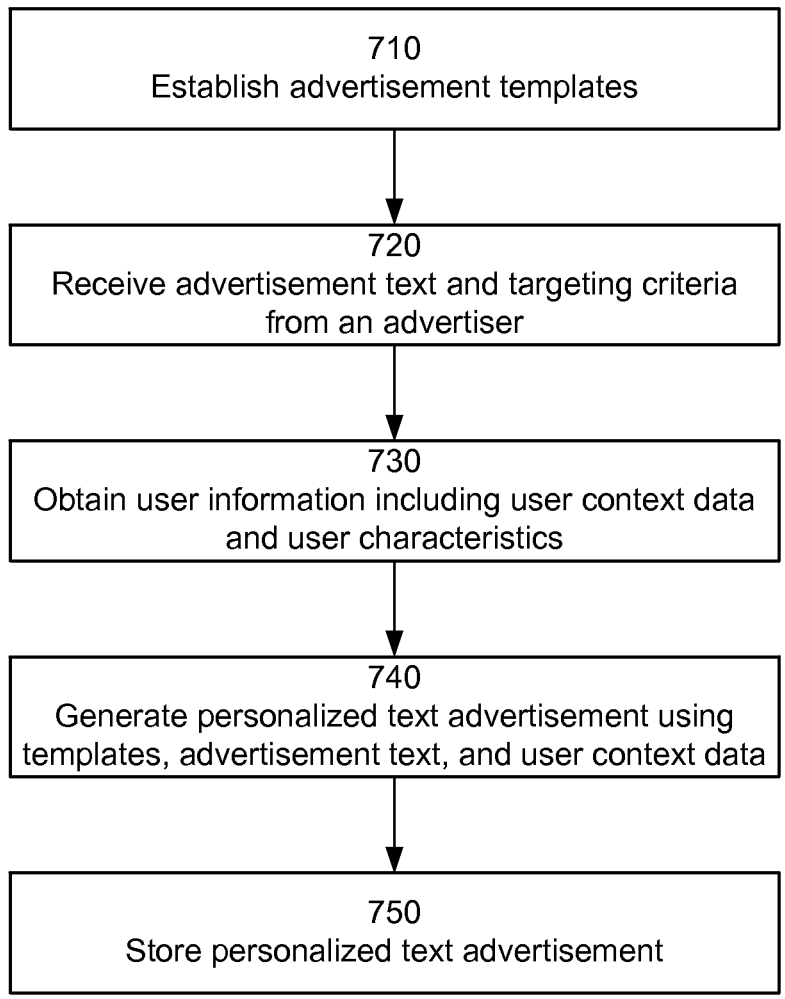
FIG. 7 is a flowchart illustrating an example process for generating a personalized text advertisement, according to an embodiment.

FIG. 7 is a flowchart illustrating an example process for generating a personalized text ad, according to an embodiment. Other entities may perform some or all of the steps of the process in other embodiments. Likewise, embodiments may include different and/or additional steps, or perform the steps in different orders.

The ad construction server 135 establishes 710 advertisement templates, which are stored in the template store 440. To establish an advertisement template, the ad construction server 135 may receive advertisement templates from advertisers 120 or through administrators configuring the ad construction server 135. The ad construction server 135 may also generate advertisement templates based on spoken audio advertisements received from advertisers 120 by applying pattern recognition algorithms to text obtained using speech-to-text algorithms.

The ad construction server 135 (e.g., the ad collector 430) receives 720 advertisement text and targeting criteria from an advertiser 120. The advertisement text comprises a company name, a product name, or a tagline, for example. The targeting criteria specify characteristics of users in the target audience or characteristics (e.g., keywords) in news text or content text to be paired with the advertisement text.

The ad construction server 135 (e.g., the user information collector 410) obtains 730 user information about the user of a client device 110. The user information includes profile data, location data, content data, or preference data. Profile data refers to enduring (i.e., slowly changing) characteristics of a user. Location data may be received through a location sensor 310 on the client device 110 or inferred from a user's network connection. Content data refers to content consumed by the user, particularly content consumed recently (e.g., within the last five or next five minutes, within one song of a currently playing song). For example, content data describes an item of audio content provided to the client device 110 for playback immediately before or immediately after the audio advertisement. Preference data refers to inclinations of a user toward audio content, advertisements, and informational notices.

The ad construction server 135 (e.g., the news collector 420) obtains news text derived from informational notices. The ad construction server 135 obtains user data (e.g., a user location associated with the client device 110) and identifies an informational notice relevant to a geographic area including the obtained location. The informational notice (e.g., an update) may be retrieved from a news source. The content server 130 then generates news text derived from the informational notice.

The ad construction server 135 also obtains content text derived from supplemental content information relevant to retrieved content data. The supplemental content may be identified for being relevant to content data describing audio content provided to the client device 110 for playback immediately before or immediately after the audio advertisement. For example, relevant supplemental content refers to bibliographic information about an item of audio content described by the content data.

The ad construction server 135 (e.g., the content information collector 425) obtains user content data describing content transmitted to the client device 110 and generates content text (e.g., bibliographic information about a song, a descriptor of content playlist) derived from the content data. The ad construction server 135 may also identify an informational notice relevant to the retrieved content data and generate news context text derived from the informational notice. For example, the informational notice is relevant to content data describing an item of audio content played immediately before or immediately after the audio advertisement. The informational notice may also be relevant to a geographic area comprising an obtained location of the user's client device 110.

The ad construction server 135 (e.g., the ad text assembler 450) generates 740 a personalized text ad according to an advertisement template specifying an ordered combination of text components. The personalized text ad includes received advertisement text, user information text selected from the obtained user information, and template text. Alternatively or additionally, the personalized text ad generated 740 by the ad construction server 135 includes content text, news text, or content news text. For example, the content text describes an item of audio content played immediately before or after an audio advertisement based on the personalized ad text. In one embodiment, generating 740 a personalized text ad includes identifying an informational notice or supplemental content information that is relevant to the retrieved targeting criteria and generating the personalized text ad to include news text or content text derived from the informational notice or supplemental content information.

In one embodiment, the ad construction server 135 generates 740 a personalized text ad comprising advertisement text targeted to audio content provided to the client device 110. The ad construction server 135 retrieves targeting criteria received from an advertiser, where the targeting criteria specify bibliographic information about audio content. For example, the audio content is an item of audio content played immediately before or immediately after an audio advertisement based on the personalized text ad. The ad construction server 135 determines whether the item of audio content matches the bibliographic information specified by the targeting criteria. In response to determining that the item of audio content matches the bibliographic information specified by the targeting criteria, the ad construction server 135 generates 740 a personalized text advertisement including the advertisement text. The personalized text advertisement may also include content text describing the item of content.

The ad construction server 135 (e.g., the ad text assembler 450) stores 750 the generated personalized text ad among various other generated personalized text ads having different text components and different combinations of text components.

Advertisement Selection

Figure 8:
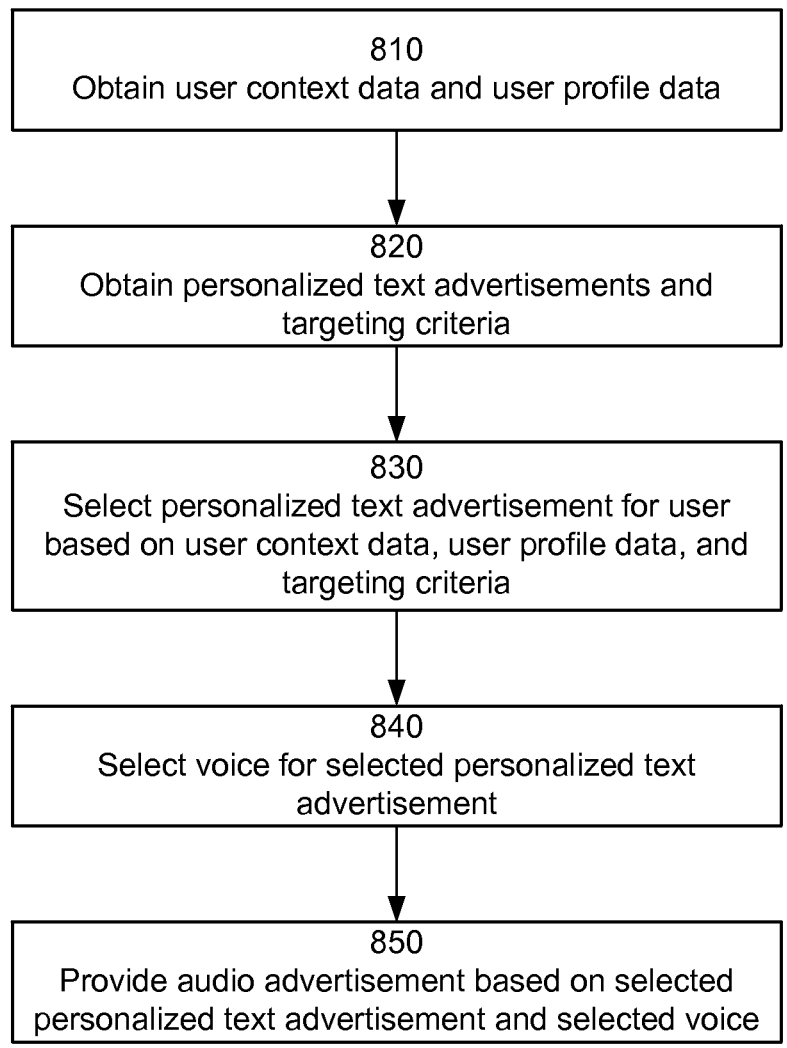
FIG. 8 is a flowchart illustrating an example process for providing an audio advertisement to a client device, according to an embodiment.

FIG. 8 is a flowchart illustrating an example process for providing an audio advertisement to a client device 110, according to an embodiment. Other entities may perform some or all of the steps of the process in other embodiments. Likewise, embodiments may include different and/or additional steps, or perform the steps in different orders.

The ad selection server 137 (e.g., the user information collector 510) obtains 810 user information of a user associated with the client device 110. The user information includes profile data, location data, content data, or preference data, for example.

The ad selection server 137 obtains 820 personalized text ads generated by the ad construction server 135. The personalized text ads comprise advertisement text, which is associated with targeting criteria received from advertisers 120.

The ad selection server 137 (e.g., the ad selector 520) selects 830 a personalized text ad for the user from the obtained personalized text ads based on the targeting criteria and obtained user information. In one embodiment, the ad selection server 137 identifies previous personalized text ads provided to the client device 110 and determines whether the previous personalized text ads include a particular personalized text ad. The ad selection server 137 selects 830 the particular personalized text ad if the previous personalized text ads do not include the personalized text ad. The ad selection server 137 does not select the particular personalized text ad if the previous text ads include the personalized text (i.e., the particular personalized text ad has been played for the user before).

The ad selection server 137 (e.g., the voice selector 530) selects 840 a voice for the text-to-speech (TTS) algorithm based on the obtained user information about the user of the client device 110, content of the personalized text ad, and content data describing digital audio content transmitted to the client device 110. Selecting 840 may refer to selecting a preset voice and/or to selecting vocal parameters to customize a voice generated by a TTS algorithm. Example vocal parameters include a gender of the voice, an emotion of the voice, a timbre of the voice, and pitch of the voice. In one embodiment, the ad selection server 137 identifies audio features of an item of audio content provided to the client device 110 for playback immediately before or immediately after the audio advertisement. The ad selection server 137 then selects 840 the voice, where the selected voice has vocal parameters determined based on the identified audio features.

The ad selection server 137 provides 850 the client device 110 with an advertisement based on the personalized text ad. The client device 110 is configured to play an audio version of the personalized text ad generated by a TTS algorithm. In one embodiment, the ad selection server 137 (e.g., the ad audio generator 540) generates the audio version of the personalized text ad using the text-to-speech algorithm and the selected voice. The ad selection server 137 then provides 850 the client device 110 with an audio version of the personalized text ad. In one embodiment, the ad selection server 137 provides 850 the client device 110 with the personalized text ad and the selected voice. The client device 110 is configured to generate the audio version of the personalized text ad using a TTS algorithm based on the selected voice.

Computer

Figure 9:
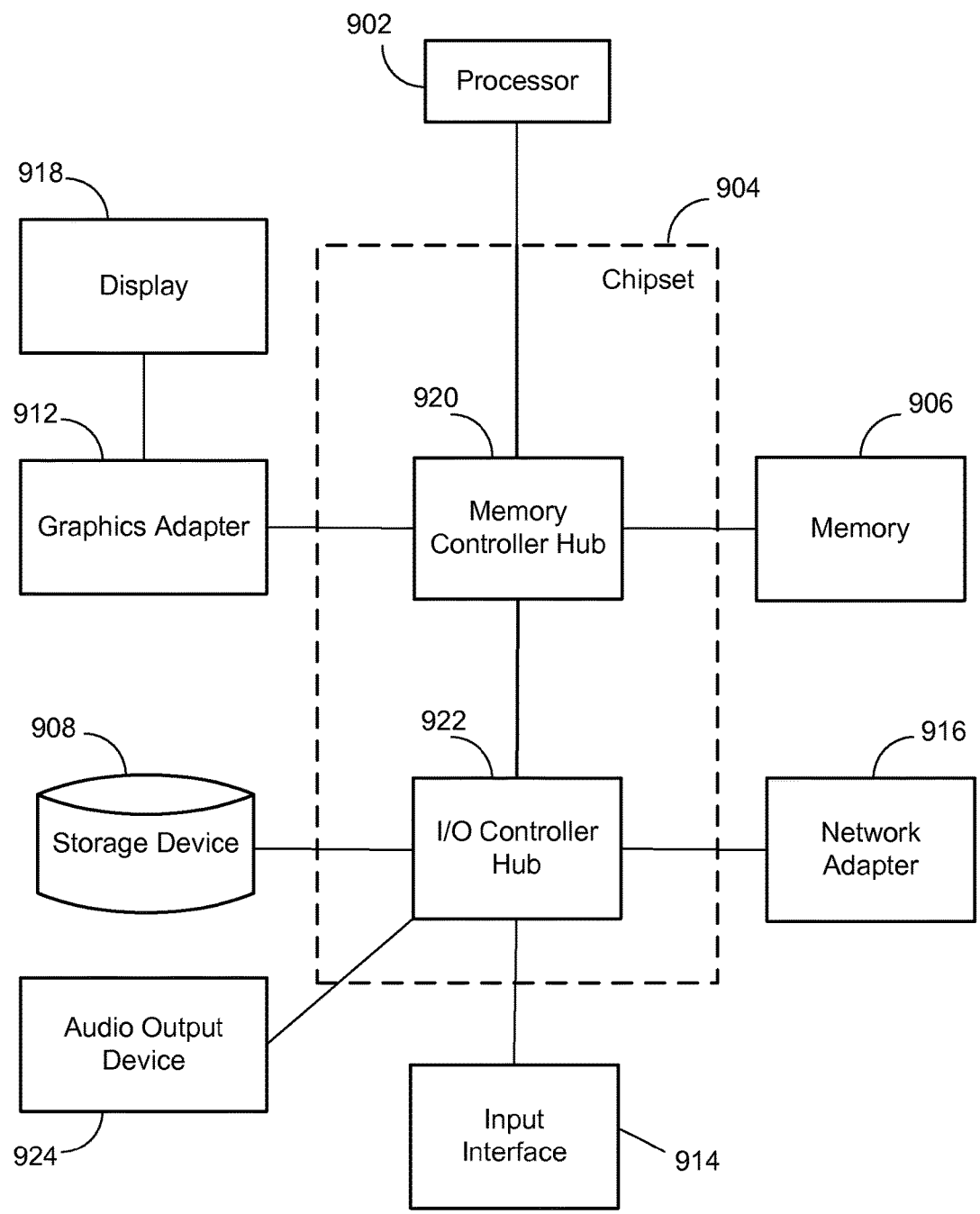
FIG. 9 is a high-level block diagram illustrating an example computer 900 for implementing the entities shown in FIG. 1, according to an embodiment.

FIG. 9 is a high-level block diagram illustrating an example computer 900 for implementing the entities shown in FIG. 1, according to an embodiment. The computer 900 includes at least one processor 902 coupled to a chipset 904. The chipset 904 includes a memory controller hub 920 and an input/output (I/O) controller hub 922. A memory 906 and a graphics adapter 912 are coupled to the memory controller hub 920, and a display 918 is coupled to the graphics adapter 912. A storage device 908, an input interface 914, a network adapter 916, and an audio output device 924 are coupled to the I/O controller hub 922. Other embodiments of the computer 900 have different architectures.

The storage device 908 is a non-transitory computer-readable storage medium such as a hard drive, compact disk read-only memory (CD-ROM), DVD, or a solid-state memory device. The memory 906 holds instructions and data used by the processor 902. The input interface 914 is a touch-screen interface, a mouse, track ball, or other type of pointing device, a keyboard, or some combination thereof, and is used to input data into the computer 900. In some embodiments, the computer 900 may be configured to receive input (e.g., commands) from the input interface 914 via gestures from the user. The graphics adapter 912 displays images and other information (e.g., the user interface 320) on the display 918. The network adapter 916 couples the computer 900 to one or more computer networks 140. In one embodiment, the display 918 and input interface 914 are combined as a touch-sensitive display (e.g., a touch screen), which detects gestures (e.g., scrolling, tapping, swiping, pinching, stretching). The audio output device 924 produces audible sound waves from electrical signals. The audio output device includes hardware to convert electrical signals to mechanical vibrations (e.g., a piezoelectric speaker, a dynamic loudspeaker) as well as accompanying electronic circuitry (e.g., an amplifier, a digital-to-analog converter).

The computer 900 is adapted to execute computer program modules for providing functionality described herein. As used herein, the term "module" refers to computer program logic used to provide the specified functionality. Thus, a module can be implemented in hardware, firmware, software, and/or a combination thereof. In one embodiment, program modules (e.g., ad text assembler 450, the ad selector 520) are stored on the storage device 908, loaded into the memory 906, and executed by the processor 902.

The types of computers 900 used to implement the entities of FIG. 1 can vary depending upon the embodiment and the processing power required by the entity. For example, the client device 110 is a computer 900 such as a smart phone or a tablet. As another example, the content server 130 is one or more servers working together to provide the functionality described herein. A computer 900 (e.g., a server) may lack some of the components described above, such as a keyboard, a graphics adapter 912, and a display 918. Alternatively or additionally, the functionality of a computer 900 may be provided by multiple communicatively coupled devices. For example, the client device 110 is a tablet including many of the components of the computer 900 (e.g., the network adapter 916, the chipset 904, the processor 902) communicatively coupled with external audio output device 924 (e.g., a home sound system comprising multiple speakers).

Additional Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating personalized audio advertisements. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method for providing an audio message using personalized text, the method comprising:
    receiving, from a client device associated with a user, a request for audio content;
    retrieving message content;
    obtaining user information about the user of the client device;
    generating personalized text according to a template specifying an ordered combination of text components, the personalized text comprising the message content, user information text selected from the obtained user information, and template text;
    identifying audio features of an item of audio content provided to the client device for playback immediately adjacent to the audio message;
    selecting a voice for a text-to-speech algorithm, the selected voice having vocal parameters determined based on the identified audio features of the item of audio content; and
    causing an audio message based on an audio version of the personalized text to play on the client device, the audio version generated by the text-to-speech algorithm using the selected voice, the audio message played adjacent to the item of audio content in a stream of audio content provided to the client device responsive to the request for audio content.

2. The method of claim 1, wherein generating the personalized text comprises:
    retrieving content data describing the item of audio content provided to the client device for playback immediately adjacent to the audio message; and
    generating the personalized text according to the template, the personalized text comprising content text describing the item of audio content.

3. The method of claim 2, wherein generating the personalized text further comprises:
    retrieving targeting criteria received from a provider of the message content, the targeting criteria specifying bibliographic information about the item of audio content, the targeting criteria associated with the message content;
    determining whether the item of audio content matches the bibliographic information specified by the targeting criteria; and
    generating the personalized text comprising the content text and the message content responsive to determining that the item of audio content matches the bibliographic information.

4. The method of claim 1, wherein generating the personalized text further comprises:
    retrieving content data describing the item of audio content provided to the client device for playback immediately adjacent to the audio message;
    identifying supplemental content information relevant to the content data; and
    generating the personalized text according to the template, the personalized text comprising content text derived from the supplemental content information.

5. The method of claim 4, wherein identifying supplemental content information relevant to the content data comprises:
    obtaining a location of the client device; and
    identifying an informational notice relevant to the content data and relevant to a geographic area comprising the location.

6. The method of claim 1, further comprising:
    identifying previous personalized text provided to the client device;
    determining whether the previous personalized text include the personalized text; and
    selecting the personalized text responsive to determining that the previous personalized text do not include the personalized text.

7. A non-transitory computer-readable storage medium comprising computer program instructions executable by a processor, the instructions for:
    receiving, from a client device associated with a user, a request for audio content;
    retrieving message content;
    obtaining user information about the user of the client device;
    generating personalized text according to a template specifying an ordered combination of text components, the personalized text comprising the message content, user information text selected from the obtained user information, and template text;
    identifying audio features of an item of audio content provided to the client device for playback immediately adjacent to the audio message;

selecting a voice for a text-to-speech algorithm, the selected voice having vocal parameters determined based on the identified audio features of the item of audio content; and causing an audio message based on an audio version of the personalized text to play on the client device, the audio version generated by the text-to-speech algorithm using the selected voice, the audio message played adjacent to the item of audio content in a stream of audio content provided to the client device responsive to the request for audio content.

8. The computer-readable medium of claim 7, wherein instructions for generating the personalized text comprise instructions for:

retrieving content data describing the item of audio content provided to the client device for playback immediately adjacent to the audio message; and generating the personalized text according to the template, the personalized text comprising content text describing the item of audio content.

9. The computer-readable medium of claim 8, wherein the instructions for generating the personalized text further comprise instructions for:

retrieving targeting criteria received from a provider of the message content, the targeting criteria specifying bibliographic information about the item of audio content, the targeting criteria associated with the message content;

determining whether the item of audio content matches the bibliographic information specified by the targeting criteria; and generating the personalized text comprising the content text and the message content responsive to determining that the item of audio content matches the bibliographic information.

10. The computer-readable medium of claim 7, wherein instructions for generating the personalized text ad comprise instructions for:

retrieving content data describing the item of audio content provided to the client device for playback immediately adjacent to the audio message;

identifying supplemental content information relevant to the content data; and generating the personalized text according to the template, the personalized text comprising content text derived from the supplemental content information.

11. The computer-readable medium of claim 10, wherein instructions for identifying the supplemental content information relevant to the content data comprise instructions for:

obtaining a location of the client device; and identifying an informational notice relevant to the content data and relevant to a geographic area comprising the location.

12. The computer-readable medium of claim 7, wherein the instructions further comprise instructions for:

identifying previous personalized text provided to the client device;

determining whether the previous personalized text include the personalized text; and selecting the personalized text responsive to determining that the previous personalized text do not include the personalized text.

13. A system for generating an audio advertisement using personalized text, the system comprising:

a processor; and a non-transitory computer-readable storage medium comprising computer program instructions executable by a processor, the instructions for:

receiving, from a client device associated with a user, a request for audio content;

retrieving message content;

obtaining user information about the user of the client device;

generating personalized text according to a template specifying an ordered combination of text components, the personalized text comprising the message content, user information text selected from the obtained user information, and template text;

identifying audio features of an item of audio content provided to the client device for playback immediately adjacent to the audio message;

selecting a voice for a text-to-speech algorithm, the selected voice having vocal parameters determined based on the identified audio features of the item of audio content; and causing an audio message based on an audio version of the personalized text to play on the client device, the audio version generated by the text-to-speech algorithm using the selected voice, the audio message played adjacent to the item of audio content in a stream of audio content provided to the client device responsive to the request for audio content.

14. The system of claim 13, wherein instructions for generating the personalized text comprise instructions for:

retrieving content data describing the item of audio content provided to the client device for playback immediately adjacent to the audio message; and generating the personalized text according to the template, the personalized text comprising content text describing the item of audio content.

15. The system of claim 14, wherein the instructions for generating the personalized text further comprise instructions for:

retrieving targeting criteria received from a provider of the message content, the targeting criteria specifying bibliographic information about the item of audio content, the targeting criteria associated with the message content;

determining whether the item of audio content matches the bibliographic information specified by the targeting criteria; and generating the personalized text comprising the content text and the message content responsive to determining that the item of audio content matches the bibliographic information.

16. The system of claim 13, wherein instructions for generating the personalized text comprise instructions for:

retrieving content data describing the item of audio content provided to the client device for playback immediately adjacent to the audio message;

identifying supplemental content information relevant to the content data; and generating the personalized text according to the template, the personalized text comprising content text derived from the supplemental content information.

17. The system of claim 16, wherein instructions for identifying the supplemental content information relevant to the content data comprise instructions for:

obtaining a location of the client device; and identifying an informational notice relevant to the content data and relevant to a geographic area comprising the location.

18. The method of claim 1, wherein selecting the voice for the text-to-speech algorithm comprises:
   determining audio features describing a vocalist in the identified item of audio content; and
   determining the vocal parameters for the selected voice responsive to the audio features describing the vocalist.

19. The method of claim 1, further comprising:
   determining preferences of the user for audio features in the stream of audio content; and
   determining the vocal preferences for the selected voice responsive to the preferences of the user for audio features.

20. The method of claim 1, further comprising:
   inferring profile vocal parameters of the user responsive at least in part to user profile data describing demographic information about the user;
   inferring content vocal parameters of the user responsive at least in part to content data describing the stream of audio content provided to the client device; and
   determining the vocal preferences for the selected voice responsive to a weighted combination of the profile vocal parameters and the content vocal parameters, wherein the weighted combination weighs the content vocal parameters more heavily than the profile vocal parameters.

* * * * *

UNITED STATES PATENT AND TRADEMARK OFFICE
CERTIFICATE OF CORRECTION

PATENT NO. : 9,959,557 B2  
APPLICATION NO. : 14/500763  
DATED : May 1, 2018  
INVENTOR(S) : Shriram Bharath, Jacek Adam Krawczyk and Christopher Irwin Page 1 of 1

It is certified that error appears in the above-identified patent and that said Letters Patent is hereby corrected as shown below:

In the Claims

Column 20, Line 47, Claim 6, after "previous personalized text" replace "include" with "includes"

Column 20, Line 50, Claim 6, after "previous personalized text" replace "do" with "does"

Column 21, Line 39, Claim 10, after "generating the personalized text" delete "ad"

Column 21, Line(s) 60-61, Claim 12, after "previous personalized text" replace "include" with "includes"

Column 21, Line 63, Claim 12, after "previous personalized text" replace "do" with "does"

Signed and Sealed this  
Thirtieth Day of October, 2018

Andrei Iancu  
*Director of the United States Patent and Trademark Office*